United States Patent Office 3,059,818
Patented Oct. 23, 1962

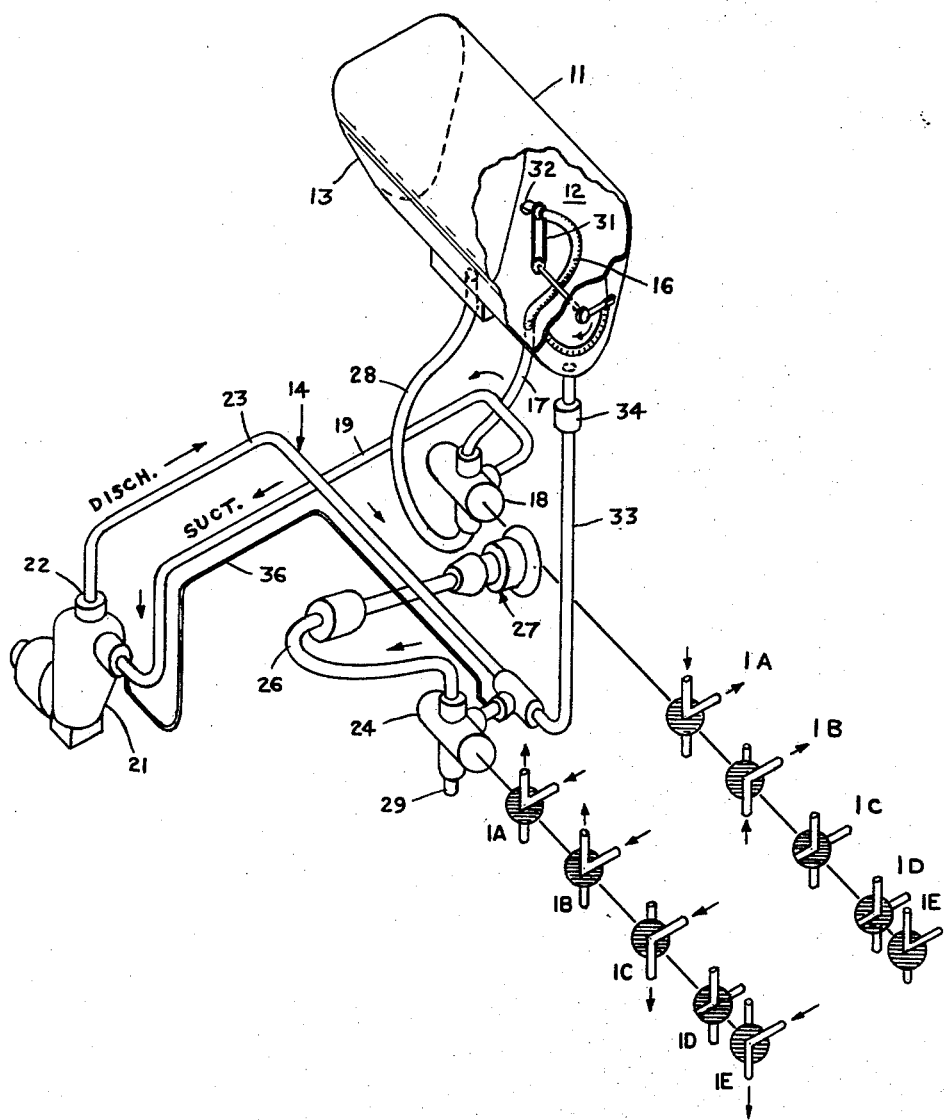

3,059,818
FLOODED WATER SYSTEM FOR TRUCK MIXERS
Louis G. Hilkemeier, Holyoke, N.J., assignor to Worthington Corporation, Harrison, N.J., a corporation of Delaware
Filed Dec. 15, 1960, Ser. No. 76,050
1 Claim. (Cl. 222—251)

This invention relates to the injection of mix water into a concrete mixer. It is a water system including an elevated tank, a pump with a discharge and a separate flooding means to deliver water from the tank to flood the discharge.

Water-cement balance is critically determinative of concrete strength. In concrete mixers, water is usually measured by volume at the tank and is delivered to the mixer drum via a pump disposed in a water-delivery conduit. Under various conditions, pump operation introduces air pockets into the water system giving rise to a source of blunders in water volume measurements with consequent distortions of the pivotal water-cement ratio. With air pockets in the water system, water volumes measured at the tank do not reach the drum.

Self-priming pumps can overcome air clogging to move water but they do not transform air bubbles into water. Accordingly, as far as water-cement balance is concerned, self-priming pumps mask the true problem of volume distortion.

The present advance eliminates volume distortion by assuring that the water system will be full at all times. More particularly, this advance is included in a conventional water system flooding means for maintaining the pump in a full condition. The flooding means comprises a water-communicating means to communicate the water tank with the pump discharge. Check means disposed in the water-communicating means prevent backing up of water from the pump discharge into the water tank. Flooding the pump discharge also points to the potential cost saving of substituting ordinary water pumps for the self-priming variety currently in vogue.

These and other advantages will be seen more fully from the specification, including the claim, viewed in conjunction with the accompanying drawing which shows a partly fragmented schematic representation of a water system for a concrete mixer including valve placement for water injection into the mixer drum in FIGURE 1A, wash water injection into the drum in FIGURE 1B, draining water from the drum in FIGURE 1C, shut off in FIGURE 1D and purging entrapped air in FIGURE 1E, respectively.

Water is stored in tank 11 supported by a frame which is not shown. Tank 11 serves to store both mix water for use as an ingredient of concrete and flush water for washing the mixer drum. To this end, tank 11 is divided into calibrated compartment 12 for mix water and flush compartment 13. We are here concerned with an improvement relating to the injection of a known quantity of mix water into the mixer drum via water-delivery conduit generally designated 14 which communicates calibrated compartment 12 of tank 11 with the mixer drum. Water-delivery conduit 14 includes, in flow series, siphon tube 16, first intake conduit 17, intake valve 18, suction conduit 19, water pump 21, discharge 22, discharge conduit 23, discharge valve 24, drum conduit 26 and injection means generally designated 27.

The selection between mix water and flush water is made by setting intake valve 18 which is movable between an injection position shown in FIGURES 1A and 1E, a flush position shown in FIGURE 1B wherein it communicates suction conduit 19 with flush compartment 13 via second intake conduit 28 and an off position shown in FIGURES 1C and 1D. Discharge valve 24 is movable between a drum position shown in FIGURES 1A and 1B wherein it communicates discharge conduit 23 with drum conduit 26, a drain position shown in FIGURES 1C and 1E wherein it communicates discharge conduit 23 with drain 29 and an off position shown in FIGURE 1D.

The flow of water from calibrated compartment 12 is controlled by meter means generally designated 31 and more fully described in U.S. Patent 2,900,115. Meter means 31 include siphon head 32 which is disposed inside calibrated compartment 12 and is adapted to be raised or lowered to determine the volme of water to be withdrawn from calibrated compartment 12. The setting of siphon head 32 will be made as hereinafter described.

It will be understood that wide changes may be made in the details of construction and the correlation of the various elements of this water system without departing from the scope of this invention. Well known hydraulic design expedients are available to cope with the various possible operating circumstances which might be encountered in concrete mixer operation.

Flooding means are provided including flood conduit 33 and check valve 34. As illustrated in the drawing flood conduit 33 communicates compartment 12 with discharge conduit 23 and has disposed therebetween a check valve 34. The purpose of flood conduit 33 and check valve 34 will be fully set forth hereinafter.

Operation

Obviously the operation of this flooded water system is controlled by the setting of the valves 18 and 24. The important operational setttings of the valves 18 and 24 are illustrated in FIGURES 1A, 1D and 1E which will be explained herein. The other settings of valves 18 and 24 are believed self evident and therefore need not be explained further.

Tank 11 is filled with water and the valves 18 and 24 are positioned as shown in FIGURE 1D and, further, pump 21 is not in operation. Air is trapped in suction conduit 19, pump 21, discharge 22 and discharge conduit 23. Air is also trapped in inlet conduit 17 but as valve 18 is shut off this doesn't matter.

The water flows by gravity into flood conduit 33 and passes check valve 34 which will only prevent flow in the opposite direction as more fully described hereinafter. Flood conduit 33 is connected directly to discharge conduit 23 and therefore the water will flow into discharge conduit 23 to discharge 22 of pump 21. It is understood that the displaced air is free to bubble into compartment 12 from flood conduit 33.

The valves 18 and 24 are now positioned as illustrated in FIGURE 1E and pump 21 is placed in operation. The water from flood conduit 33 will prime pump 21 to develop sufficient pressure to overcome the pressure in suction conduit 19 whereby the pump becomes fully operational. Furthermore, as the pressure in the discharge conduit 23 builds it reaches a pressure high enough to overcome the gravity force of the flow in the flood conduit 33 but check valve 34 prevents this water in discharge conduit 23 from entering compartment 12.

Accordingly a mixture of water and entrapped air flows out of drain 29 until all the entrapped air is removed from the delivery line 14. Thereafter valve 24 is positioned as shown in FIGURE 1A and simultaneously thereto the metering means 31 are set at the desired calibration. Hence, only the exact amount of water is allowed to reach the mixer drum. Note that the valve 18 is in the same position in FIGURES 1A and 1E and hence need not be changed. It is understood that the capacity of compartment 12 is sufficiently large to allow for the above operation to take place and still have sufficient water left to pass to the mixer drum.

As an added safety feature recirculation line 36 provides a path of flow which connects the discharge conduit 23 with the suction conduit 19. If through inadvertence valves 18 and 24 are shut off as shown in FIGURE 1D and pump 21 is in operation, this will allow water to continually recirculate from discharge conduit 23 through recirculation line 36 to suction conduit 19 and thereafter return to pump 21.

What is claimed is:

A water system for a concrete mixer comprising:
- (a) a compartment for the storage of mix water,
- (b) a pump having a suction conduit and a discharge conduit,
- (c) a first conduit connected to said compartment,
- (d) an intake valve having connections with said suction conduit and said first conduit,
- (e) said intake valve adapted to be selectively positioned to
    - (1) prevent flow therethrough
    - (2) communicate said first conduit with said suction conduit,
- (f) a flood conduit connected to said compartment to communicate said compartment with said discharge conduit whereby said pump will be flooded with water from said compartment thereby priming said pump and allowing said pump to develop sufficient pressure to overcome the pressure in said suction conduit,
- (g) said discharge conduit communicating with said mixer,
- (h) said flood conduit having check valve means therein to permit the gravity flow of water therethrough and to prevent the water during operation of said pump from entering said compartment,
- (i) a two-way discharge valve disposed in said discharge conduit intermediate the connections with said flood conduit and said mixer,
- (j) a drain conduit connected to said discharge valve,
- (k) said discharge valve adapted to be selectively positioned to
    - (1) prevent flow therethrough
    - (2) communicate said discharge conduit with said drain
    - (3) communicate said discharge conduit with said mixer.

References Cited in the file of this patent

UNITED STATES PATENTS

| | | |
|---|---|---|
| 1,560,754 | Broido | Nov. 10, 1925 |
| 2,374,970 | Ball et al. | May 1, 1945 |